United States Patent
Zhang et al.

(10) Patent No.: US 10,460,149 B2
(45) Date of Patent: *Oct. 29, 2019

(54) METHOD AND APPARATUS FOR UPDATING FINGERPRINT TEMPLATES, AND MOBILE TERMINAL

(71) Applicant: Guangdong Oppo Mobile Telecommunications Corp., Ltd., Dongguan, Guangdong (CN)

(72) Inventors: Haiping Zhang, Guangdong (CN); Yibao Zhou, Guangdong (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/196,198

(22) Filed: Nov. 20, 2018

(65) Prior Publication Data
US 2019/0087637 A1    Mar. 21, 2019

Related U.S. Application Data

(63) Continuation of application No. 15/670,014, filed on Aug. 7, 2017, which is a continuation of application No. PCT/CN2016/098119, filed on Sep. 5, 2016.

(30) Foreign Application Priority Data

Nov. 13, 2015   (CN) .......................... 2015 1 0786295

(51) Int. Cl.
    *G06K 9/00*    (2006.01)
(52) U.S. Cl.
    CPC ........... *G06K 9/00087* (2013.01); *G06K 9/00* (2013.01); *G06K 9/00013* (2013.01); *G06K 9/00926* (2013.01)

(58) Field of Classification Search
CPC ........... G06K 9/00087; G06K 9/00926; G06K 9/00013; G06K 9/00
See application file for complete search history.

(56) References Cited

U.S. PATENT DOCUMENTS 5,999,637 A    12/1999  Toyoda et al.
7,634,117 B2 *  12/2009  Cho .................... G07C 9/00158
                                                    382/124

(Continued)

FOREIGN PATENT DOCUMENTS

CN    101231691 A    7/2008
CN    101231692 A    7/2008

(Continued)

OTHER PUBLICATIONS

Office Action 1 issued in corresponding EP application No. 16863469.9 dated May 8, 2018.

(Continued)

*Primary Examiner* — Amara Abdi
(74) *Attorney, Agent, or Firm* — Young Basile Hanlon & MacFarlane, P.C.

(57) ABSTRACT

A method and an apparatus for updating fingerprint templates, and a mobile terminal are provided. The method includes acquiring a fingerprint image input by a user. The fingerprint image is compared with fingerprint templates pre-stored in a fingerprint template set, where the fingerprint template set comprises N fingerprint templates and N is a positive integer. A mobile terminal performs a target operation when a match value between the fingerprint image and an ith fingerprint template of the fingerprint template set is greater than a first preset threshold. The method determines whether the match value set is greater than a second preset threshold. The method generates a new fingerprint template based on the fingerprint image and adds the new fingerprint template to the fingerprint template set when the match (Continued)

value between the fingerprint image and the ith fingerprint template is greater than the second preset threshold.

15 Claims, 7 Drawing Sheets

(56) References Cited

U.S. PATENT DOCUMENTS

| | | | |
|---|---|---|---|
| 9,483,682 B1* | 11/2016 | Chiang | G06K 9/00087 |
| 2002/0048390 A1 | 4/2002 | Ikegami | |
| 2008/0166028 A1 | 7/2008 | Turek et al. | |
| 2008/0212846 A1 | 9/2008 | Yamamoto et al. | |
| 2012/0257802 A1* | 10/2012 | Kwon | G06K 9/00087 |
| | | | 382/124 |
| 2012/0303624 A1* | 11/2012 | Gandhi | G06F 17/2785 |
| | | | 707/740 |
| 2015/0078629 A1 | 3/2015 | Gottemukkula et al. | |
| 2015/0154317 A1* | 6/2015 | Inoue | G10L 15/28 |
| | | | 711/108 |
| 2016/0234211 A1 | 8/2016 | Gu | |
| 2016/0253547 A1* | 9/2016 | Bauchspies | G06K 9/00013 |
| | | | 382/124 |
| 2017/0091515 A1* | 3/2017 | Cao | G06F 1/1616 |
| 2017/0185765 A1* | 6/2017 | Pang | G06F 21/32 |

FOREIGN PATENT DOCUMENTS

| | | |
|---|---|---|
| CN | 101499130 A | 8/2009 |
| CN | 102254167 A | 11/2011 |
| CN | 102419819 A | 4/2012 |
| CN | 102708360 A | 10/2012 |
| CN | 102254167 B | 6/2013 |
| CN | 104217194 A | 12/2014 |
| CN | 104361272 A | 2/2015 |
| CN | 104700074 A | 6/2015 |
| CN | 105868679 A | 8/2016 |
| EP | 2624206 A1 | 8/2013 |

OTHER PUBLICATIONS

Extended European search report issued in corresponding European application No. 16863469.9 dated Oct. 9, 2017.
Uludag U et al, Biometric template selection and update: a case study in fingerprints, Jul. 1, 2004, the whole document.
Yong Li et al,Score Based Biometric Template Selection and Update, Dec. 13, 2008, pp. 36-39.
International search report issued in corresponding international application No. PCT/CN2016/098119 dated Dec. 13, 2016.

* cited by examiner

METHOD AND APPARATUS FOR UPDATING FINGERPRINT TEMPLATES, AND MOBILE TERMINAL

CROSS-REFERENCE TO RELATED APPLICATION(S)

This application is a continuation of U.S. application Ser. No. 15/670,014, filed on Aug. 7, 2017, which is a continuation of International Application No. PCT/CN2016/098119, filed on Sep. 5, 2016, which claims the priority to Chinese Patent Application No. 201510786295.4, filed on Nov. 13, 2015. The disclosures of the above applications are incorporated herein by reference in their entireties.

TECHNICAL FIELD

The present disclosure relates to a technical field of recognition, and more particularly relates to a method and an apparatus for updating fingerprint templates, and a mobile terminal.

BACKGROUND

Fingerprint recognition technology is a relatively mature recognition technique of biological feature, and has become a flagship model standard function of mobile terminals by mainstream manufacturers thereof. Fingerprint recognition is used not only to unlock and awaken mobile terminals, but also plays an important role in mobile payment procedures. The fingerprint recognition used in mobile payment procedures brings users great convenience to improve mobile payment security.

When a user unlocks a mobile terminal or performs a mobile payment procedure using the fingerprint recognition technique, the user has to input fingerprint information to the mobile terminal in advance. The mobile terminal generates a fingerprint template based on the input fingerprint information. When unlocking the mobile terminal or performing the mobile payment procedure, the user inputs a new fingerprint once again. The mobile terminal receives the new fingerprint and matches the fingerprint templates with the new fingerprint. If the new fingerprint is consistent with the fingerprint template, the user identity is correctly verified to unlock the mobile terminal or perform the mobile payment procedure.

However, due to a limited size of a fingerprint recognition module of the mobile terminal, the mobile terminal only obtains restrictive fingerprint information. Furthermore, the fingerprint templates previously pre-stored in the mobile terminal are fixed. When the user uses the fingerprint information in an unlocking procedure of the mobile terminal, a first fingerprint input cannot successfully unlock the mobile terminal and thus, the user needs multiple fingerprint inputs per unlocking procedure, thereby resulting in undesirable fingerprint unlocking experience.

BRIEF DESCRIPTION OF THE DRAWINGS

The following implementations refer to the accompanying drawings for exemplifying specific implementable implementations of the present disclosure, wherein.

Figure 1:
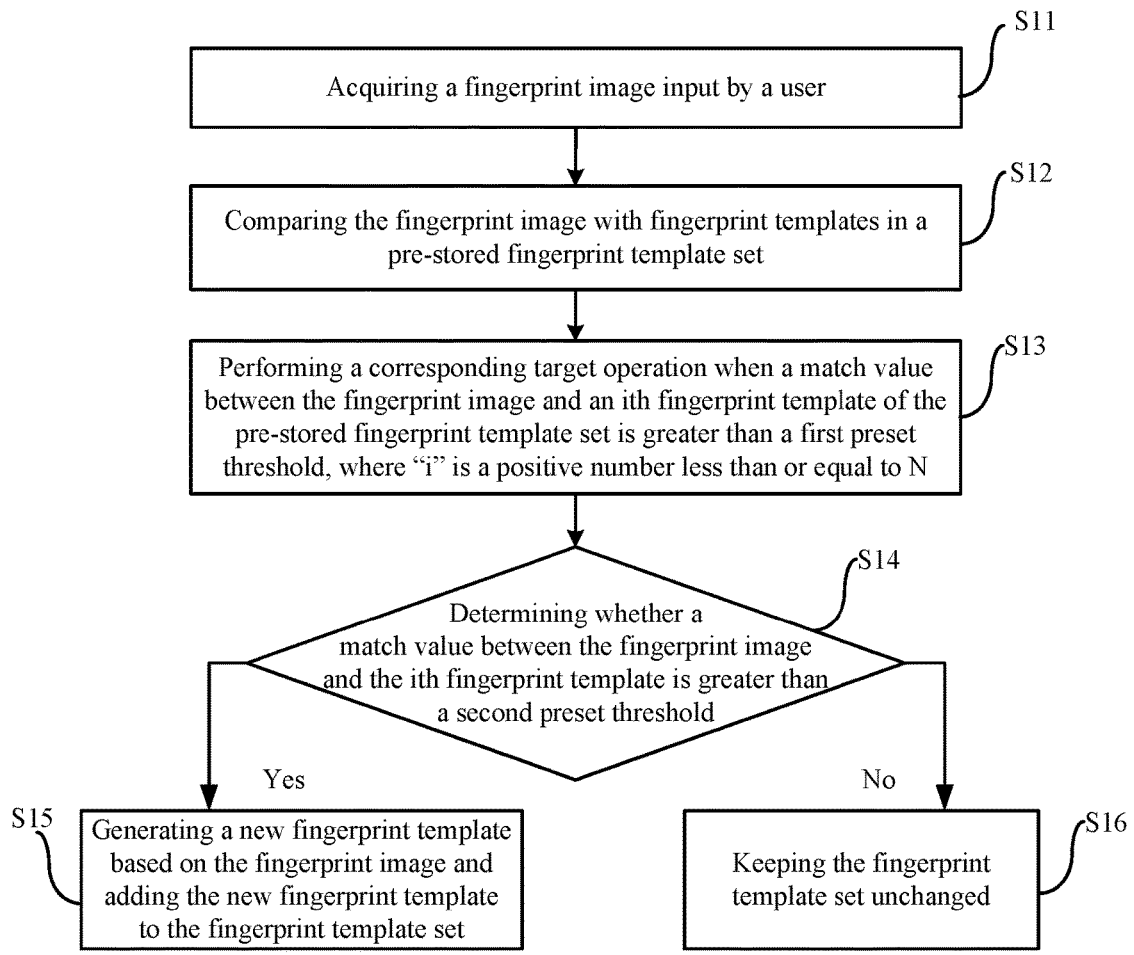
FIG. 1 is an illustrative flowchart of a method of recognizing fingerprints according to one implementation of the present disclosure.

Reference numerals include:

an acquisition module 110, a comparison module 120, an unlocking module 130, a determination module 140, a first processing module 150, a second processing module 160, a third processing module 170, a fourth processing module 180, a fifth processing module 190, an acquisition module 210, a comparison module 220, a determination module 230, a first processing module 240, a second processing module 250, a third processing module 260, a fourth processing module 270, a fifth processing module 280, a mobile terminal 90, a housing 901, a processor 902, a memory 903, a circuit board 904, and a power circuit 905.

DETAILED DESCRIPTION

The following implementations refer to the accompanying drawings for exemplifying specific implementable implementations of the present disclosure in a suitable computing environment, where similar numerals denote the same elements. It should be noted that the exemplary described implementations are configured to describe and understand the present disclosure, but the present disclosure is not limited thereto.

The following implementations refer to the accompanying drawings for exemplifying specific implementable implementations of methods of recognizing fingerprints, updating fingerprint templates, an apparatus and a mobile terminal in the present disclosure.

FIG. 1 is an illustrative flowchart of a method of recognizing fingerprints according to one implementation of the present disclosure.

As shown in FIG. 1, the method of recognizing fingerprints includes actions at the following blocks.

At block S11, a fingerprint image input by a user is acquired.

In detail, an acquisition module acquires the fingerprint image input by the user when the user uses a fingerprint to unlock a mobile terminal.

In one implementation, the mobile terminal is selected from one group consisting of hardware devices with different operating systems, such as a mobile phone, a tablet computer, a personal digital assistant, and electronic books.

In the present disclosure, the mobile terminal is taken as an example for explaining the method of recognizing fingerprints, it can be understood that, the mobile terminal can be replaced by other electronic devices with function of fingerprint identification.

At block S12, the fingerprint image is compared with fingerprint templates in a pre-stored fingerprint template set.

The fingerprint template set includes N fingerprint templates, where N is a positive integer.

In one implementation, when acquiring the fingerprint image input by the user, the fingerprint image is matched with N (e.g., 30) of fingerprint templates in the fingerprint template set and a match value between the fingerprint image and each of the fingerprint templates is computed. This determines whether each of the match values is greater than a first preset threshold.

The first preset threshold is defined as a match threshold between a preset fingerprint image and a fingerprint template. For example, the first preset threshold is represented as 85%.

It should be noted that each of the fingerprint templates includes a fingerprint image pre-stored in the mobile terminal. The fingerprint image input by the user is matched with fingerprint templates in the fingerprint template set. In other words, the fingerprint image input by the user is matched with fingerprint images of the fingerprint templates.

At block S13, when a match value between the fingerprint image and an ith fingerprint template of the fingerprint template set is greater than the first preset threshold, the mobile terminal performs corresponding target operations, where "i" is a positive number and is less than or equal to N.

In one implementation, the target operations are selected from one group consisting of, but not limited to, an unlocking operation and a mobile payment procedure.

In order to improve operational efficiency of the mobile terminal, each of fingerprint templates in the fingerprint template set according to one implementation of the present disclosure includes weight information. In one implementation, when the fingerprint image is matched with fingerprint templates of the fingerprint template set, a matching frequency corresponding to each of the fingerprint templates in the fingerprint template set is acquired. The weight information of each fingerprint template is updated based on the matching frequency corresponding to the fingerprint template.

When updating the weight information corresponding to each of the fingerprint templates, a matching order is determined according to the weight information of each fingerprint template.

In one implementation, higher matching frequency corresponding to the fingerprint template means more effective weight information and higher matching order.

In one implementation, the matching frequency relates to a number of match times between a fingerprint template and a fingerprint image input by the user. Higher number of match times between the fingerprint image of the fingerprint template and the fingerprint image input by the user means higher matching frequencies corresponding to the fingerprint template.

When the fingerprint image input by the user is matched with the fingerprint templates of the fingerprint template set, the fingerprint image input by the user is matched with at least one of the fingerprint templates of the fingerprint template set based on the matching order. In other words, the fingerprint image is matched with the fingerprint template having the highest matching order and a match value between the fingerprint image and the fingerprint template is computed. If the match value is greater than a first preset threshold, the mobile terminal performs corresponding target operations to reduce match time spent in matching the fingerprint image with the fingerprint templates in the fingerprint template set, so as to improve operational efficiency of the mobile terminal.

For example, when the target operation is to unlock a mobile terminal using a fingerprint, a fingerprint template set includes five fingerprint templates 1 to 5. The matching order of the five fingerprint templates is fingerprint templates 3, 2, 1, 5, and 4 based on the weight information of the fingerprint templates. In order to improve unlocking efficiency of the mobile terminal, when the fingerprint image is matched with the fingerprint templates of the fingerprint template set, the fingerprint image is compared with the fingerprint template 3 and the match value between the fingerprint image and the fingerprint template 3 is computed. This determines whether the match value is greater than a first preset threshold. If the match value is greater than the first preset threshold, this determines that the fingerprint image input by the user meets requirements to unlock the mobile terminal.

At block S14, an action at this block determines whether a match value between the fingerprint image and the ith fingerprint template of the fingerprint template set is greater than a second preset threshold.

The second preset threshold is greater than the first preset threshold.

The second preset threshold is defined as a match threshold between a preset fingerprint image and a fingerprint template. For example, the second preset threshold is represented as 95%.

At block S15, if the match value between the fingerprint image and the ith fingerprint template is greater than a second preset threshold, the mobile terminal generates a new fingerprint template based on the fingerprint image and adds the new fingerprint template to the fingerprint template set.

For example, the first preset threshold is 85% and the second preset threshold is 95%. When a match value between the fingerprint image and the fingerprint template 3 of the fingerprint template set is 96%, the mobile terminal performs corresponding target operations and determines that the match value is greater than the second preset threshold. At this time, the mobile terminal generates a new fingerprint template based on the fingerprint image and adds the new fingerprint template to the fingerprint template set.

At block S16, if the match value between the fingerprint image and the ith fingerprint template is less than or equal to the second preset threshold, the fingerprint templates of the fingerprint template set keep unchanged.

In the method of recognizing fingerprints of the implementation of the present disclosure, the fingerprint image input by a user is first acquired. The fingerprint image is compared with N fingerprint templates in a fingerprint template set. If a match value between the fingerprint image and the ith fingerprint template of the fingerprint template set is greater than the first preset threshold, the mobile terminal performs corresponding target operations. It is further determined whether a match value between the fingerprint image and the ith fingerprint template of the fingerprint template set is greater than a second preset threshold. If the match value between the fingerprint image and the ith fingerprint template is greater than a second preset threshold, the mobile terminal generates a new fingerprint template based on the fingerprint image and adds the new fingerprint template to the fingerprint template set.

Therefore, the fingerprint templates of the fingerprint template set are no longer fixed. In a subsequent match procedure of the fingerprint templates, the fingerprint images input by users continuously improve and supplement the fingerprint templates of the fingerprint template set to increase operational efficiency of the mobile terminal and user experience.

Based on the above-mentioned implementations, if a match value between the fingerprint image and the ith fingerprint template of the fingerprint template set is greater than the first preset threshold and is less than the second preset threshold, image quality of the fingerprint image is compared with image quality of the ith fingerprint template. When the image quality of the fingerprint image is better than the image quality of the ith fingerprint template, the fingerprint image replaces the ith fingerprint template. When the image quality of the fingerprint image is not better than the image quality of ith fingerprint template, the ith fingerprint template keeps unchanged.

In other words, when the match value between the fingerprint image and ith fingerprint template of the fingerprint template set is greater than the first preset threshold and is less than the second preset threshold, the image quality of the fingerprint image is compared with image quality of ith fingerprint template. When the image quality of the fingerprint image is better than the image quality of ith fingerprint template, the ith fingerprint template is updated based on the fingerprint image to renew ith fingerprint template. Therefore, the fingerprint templates of the fingerprint template set are optimized. The more precise the fingerprint templates of the fingerprint template set, time spent in unlocking the mobile terminal using a fingerprint is decreased, to improve unlocking efficiency of the mobile terminal and user experience.

Figure 2:
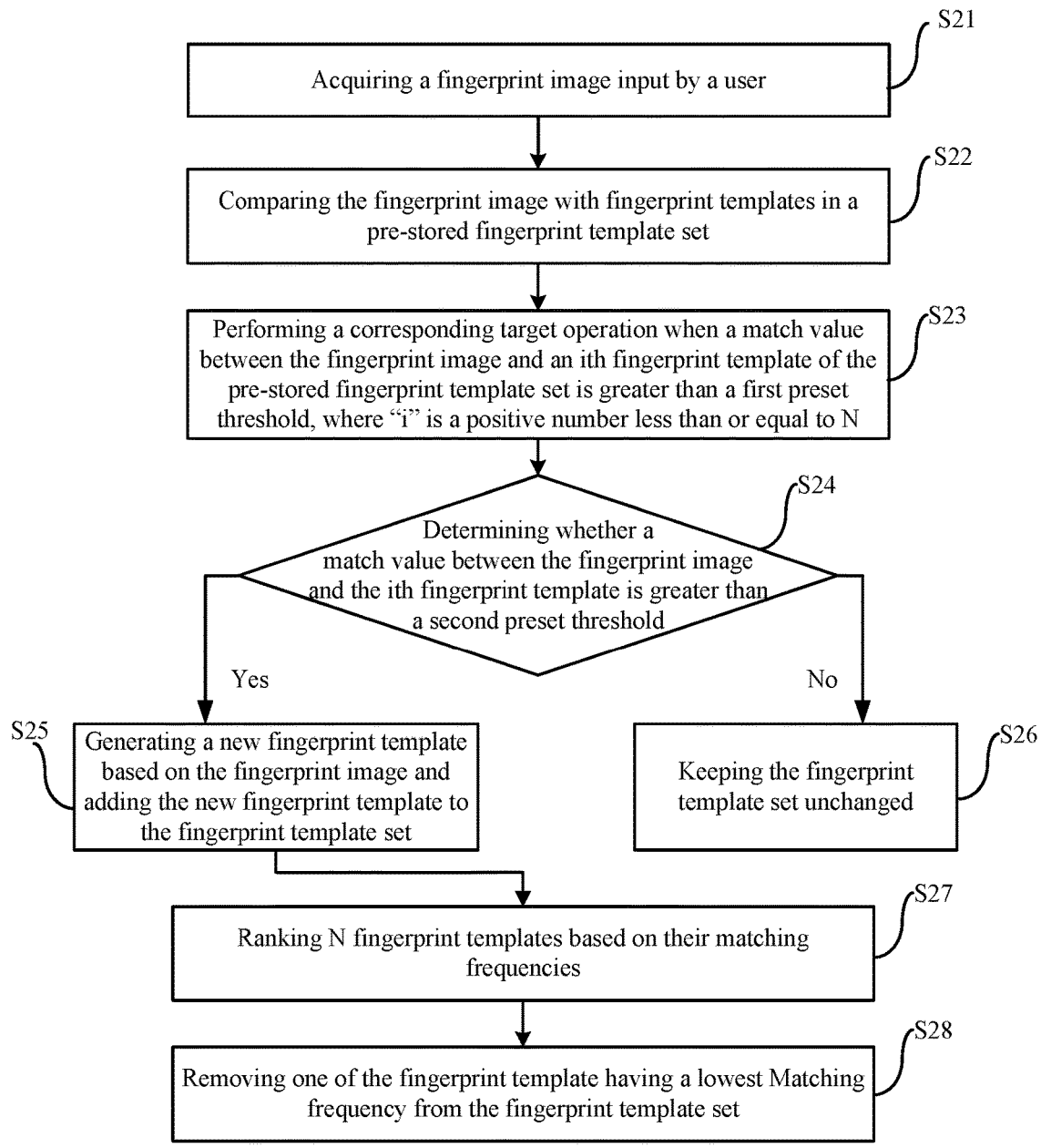
FIG. 2 is an illustrative flowchart of a method of recognizing fingerprints according to another implementation of the present disclosure.

FIG. 2 is an illustrative flowchart of a method of recognizing fingerprints according to another implementation of the present disclosure.

As shown in FIG. 2, the method of recognizing fingerprints includes the actions at following blocks.

At block S21, a fingerprint image input by a user is acquired.

In detail, an acquisition module acquires the fingerprint image input by the user when the user uses a fingerprint to unlock a mobile terminal.

In one implementation, the mobile terminal is selected from one group consisting of hardware devices with different operating systems, such as a mobile phone, a tablet computer, a personal digital assistant, and electronic books.

At block S22, the fingerprint image is compared with fingerprint templates in a pre-stored fingerprint template set.

The fingerprint template set includes N fingerprint templates, where N is a positive integer.

In one implementation, when acquiring the fingerprint image input by the user, the fingerprint image is matched with N (e.g., 30) of fingerprint templates in the fingerprint template set and a match value between the fingerprint image and each of the fingerprint templates is computed. This determines whether each of the match values is greater than a first preset threshold.

The first preset threshold is defined as a match threshold between a preset fingerprint image and a fingerprint template. For example, the first preset threshold is represented as 85%.

It should be noted that each of the fingerprint templates includes a fingerprint image pre-stored in the mobile terminal. The fingerprint image input by the user is matched with fingerprint templates in the fingerprint template set. In other words, the fingerprint image input by the user is matched with fingerprint images of the fingerprint templates.

At block S23, if a match value between the fingerprint image and an ith fingerprint template of the fingerprint template set is greater than the first preset threshold, the mobile terminal performs corresponding target operations, where "i" is a positive number and is less than or equal to N.

In one implementation, the target operations are selected from one group consisting of, but not limited to, an unlocking operation and a mobile payment procedure.

In order to improve operational efficiency of the mobile terminal, each of fingerprint templates in the fingerprint template set includes weight information. In one implementation, when the fingerprint image is matched with fingerprint templates of the fingerprint template set, a matching frequency corresponding to each of the fingerprint templates in the fingerprint template set is acquired. The weight information of each fingerprint template is updated based on the matching frequency corresponding to the fingerprint template.

When updating the weight information corresponding to each of the fingerprint templates, a matching order is determined according to the weight information of each fingerprint template.

In one implementation, higher matching frequencies corresponding to the fingerprint template mean more effective weight information and higher matching order.

In one implementation, the matching frequency relates to a number of match times between a fingerprint template and a fingerprint image input by the user. Higher number of match times between the fingerprint image of the fingerprint template and the fingerprint image input by the user means higher matching frequencies corresponding to the fingerprint template.

When the fingerprint image input by the user is matched with the fingerprint templates of the fingerprint template set, the fingerprint image input by the user is matched with at least one of the fingerprint templates of the fingerprint template set based on the matching order. In other words, the fingerprint image is matched with the fingerprint template having the highest matching order and a match value between the fingerprint image and the fingerprint template is computed. If the match value is greater than a first preset threshold, the mobile terminal performs corresponding target operations to reduce match time spent in matching the fingerprint image with the fingerprint templates in the fingerprint template set, so as to improve operational efficiency of the mobile terminal.

For example, when the target operation is to unlock a mobile terminal using a fingerprint, a fingerprint template set includes five fingerprint templates 1 to 5. The matching order of the five fingerprint templates is fingerprint templates 3, 2, 1, 5, and 4 based on the weight information of the fingerprint templates. In order to improve unlocking efficiency of the mobile terminal, when the fingerprint image is matched with the fingerprint templates of the fingerprint template set, the fingerprint image is compared with the fingerprint template 3 and the match value between the fingerprint image and the fingerprint template 3 is computed. This determines whether the match value is greater than a first preset threshold. If the match value is greater than the first preset threshold, this determines that the fingerprint image input by the user meets requirements to unlock the mobile terminal.

At block S24, an action at this block determines whether a match value between the fingerprint image and the ith fingerprint template of the fingerprint template set is greater than a second preset threshold.

The second preset threshold is greater than the first preset threshold.

The second preset threshold is defined as a match threshold between a preset fingerprint image and a fingerprint template. For example, the second preset threshold is represented as 95%.

At block S25, if the match value between the fingerprint image and the ith fingerprint template is greater than a second preset threshold, the mobile terminal generates a new fingerprint template based on the fingerprint image and adds the new fingerprint template to the fingerprint template set.

For example, the first preset threshold is 85% and the second preset threshold is 95%. When a match value between the fingerprint image and the fingerprint template 3 of the fingerprint template set is 96%, the mobile terminal performs corresponding target operations and determines that the match value is greater than the second preset threshold. At this time, the mobile terminal generates a new fingerprint template based on the fingerprint image and adds the new fingerprint template to the fingerprint template set.

At block S26, if the match value between the fingerprint image and the ith fingerprint template is less than or equal to the second preset threshold, the fingerprint templates of the fingerprint template set keep unchanged.

At block S27, N fingerprint templates are ranked based on their matching frequencies.

At block S28, one of the fingerprint template having a lowest matching frequency is removed from the fingerprint template set.

In order to maintain a number of the fingerprint templates in the fingerprint template set within a threshold, a matching frequency of each fingerprint template is acquired and the fingerprint templates in the fingerprint template set are ranked based on their matching frequencies. The fingerprint template having the lowest matching frequency for a long time is removed from the fingerprint template set to keep the number of the fingerprint templates in the fingerprint template set as N.

In an implementation, N fingerprint templates are ranked in a descending order based on their matching frequencies, then the fingerprint template having a lowest ranked has the lowest matching frequency, and is the removed from the fingerprint template set.

In other words, when the user uses a fingerprint to unlock a mobile terminal and the fingerprint image is matched with the fingerprint template, the fingerprint template having the lowest matching frequency is removed from the fingerprint template set such that the fingerprint templates of the fingerprint template set is optimized. Since fingerprint template quality of the fingerprint template set is gradually improved, a fingerprint recognition rate is increased and a false rejection rate (FRR) is decreased during a subsequent match procedure. Thus, time spent in unlocking the mobile terminal is decreased, to improve the operational efficiency of the mobile terminal and user experience.

In the method of recognizing fingerprints of the implementation of the present disclosure, the fingerprint image input by a user is first acquired. The fingerprint image is compared with N fingerprint templates in a fingerprint template set. If a match value between the fingerprint image and the ith fingerprint template of the fingerprint template set is greater than the first preset threshold, the mobile terminal is unlocked. It is further determined whether a match value between the fingerprint image and the ith fingerprint template of the fingerprint template set is greater than a second preset threshold. If the match value between the fingerprint image and the ith fingerprint template is greater than a second preset threshold, the mobile terminal generates a new fingerprint template based on the fingerprint image and adds the new fingerprint template to the fingerprint template set. Therefore, the fingerprint templates of the fingerprint template set are no longer fixed. In a subsequent match procedure of the fingerprint templates, the fingerprint images input by users continuously improve and supplement the fingerprint templates of the fingerprint template set to increase operational efficiency of the mobile terminal and user experience.

In order to implement the above implementation, the present disclosure further provides an apparatus, where the apparatus can be a part of a mobile terminal or an electronic device. The apparatus also can be an entire mobile terminal or an entire other electronic device with function of fingerprint identification. The apparatus has a function of recognizing fingerprints.

Figure 3:
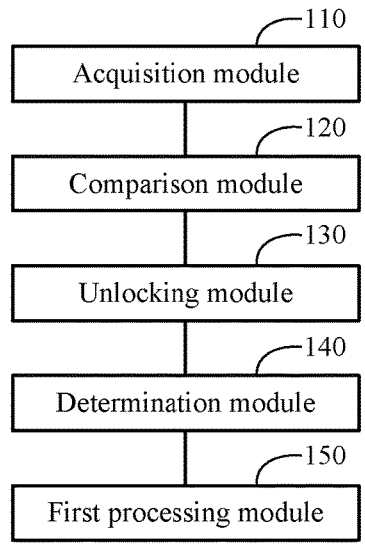
FIG. 3 is an illustrative structural diagram of an apparatus of recognizing fingerprints according to one implementation of the present disclosure.

FIG. 3 is an illustrative structural diagram of an apparatus of recognizing fingerprints according to one implementation of the present disclosure.

The apparatus includes an acquisition module 110, a comparison module 120, an unlocking module 130, a determination module 140, and a first processing module 150.

The acquisition module 110 is configured to acquire a fingerprint image input by a user.

The comparison module 120 is configured to compare the fingerprint image with fingerprint templates pre-stored in a fingerprint template set.

The fingerprint template set includes N fingerprint templates, where N is a positive integer.

It should be noted that each of the fingerprint templates includes a fingerprint image pre-stored in the mobile terminal. The comparison module 120 is configured to match the fingerprint image input by the user with fingerprint templates in the fingerprint template set. In other words, the comparison module 120 is configured to match the fingerprint image input by the user with fingerprint images of the fingerprint templates.

The unlocking module 130 is configured to unlock the mobile terminal according to one of target operations if a match value between the fingerprint image and an ith fingerprint template of the fingerprint template set is greater than the first preset threshold, where "i" is a positive number and is less than or equal to N.

In one implementation, the target operations are selected from one group consisting of, but not limited to, an unlocking operation and a mobile payment procedure.

The determination module 140 is configured to determine whether a match value between the fingerprint image and the ith fingerprint template of the fingerprint template set is greater than a second preset threshold, where the second preset threshold is greater than the first preset threshold.

The first processing module 150 is configured to generate a new fingerprint template based on the fingerprint image and add the new fingerprint template to the fingerprint template set if the match value between the fingerprint image and the ith fingerprint template is greater than the second preset threshold.

Figure 4:
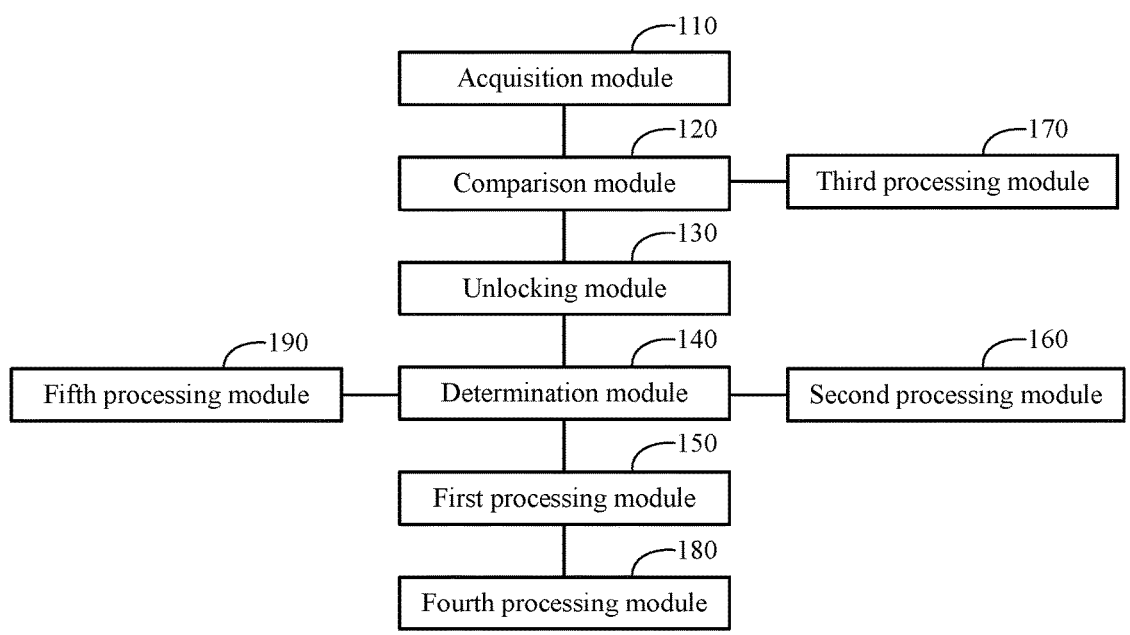
FIG. 4 is an illustrative structural diagram of an apparatus of recognizing fingerprints according to another implementation of the present disclosure.

As shown in FIG. 4, the apparatus of recognizing fingerprints further includes a second processing module 160. The second processing module 160 is configured to keep the fingerprint templates of the fingerprint template set unchanged if the match value between the fingerprint image and the ith fingerprint template is less than or equal to the second preset threshold.

In order to improve operational efficiency of the mobile terminal, each of fingerprint templates in the fingerprint template set includes weight information according to one implementation of the present disclosure. In FIG. 4, the apparatus of recognizing fingerprints further includes a third processing module 170. The third processing module 170 is configured to acquire a matching frequency corresponding to each of the fingerprint templates in the fingerprint template set when the fingerprint image is matched with fingerprint templates of the fingerprint template set. Furthermore, the third processing module 170 is configured to update the weight information of each fingerprint template based on the matching frequency corresponding to the fingerprint template.

In one implementation, higher matching frequencies corresponding to the fingerprint template mean more effective weight information and higher matching order.

In one implementation, the matching frequency relates to a number of match times between a fingerprint template and a fingerprint image input by the user. Higher number of match times between the fingerprint image of the fingerprint template and the fingerprint image input by the user means higher matching frequencies corresponding to the fingerprint template.

When the fingerprint image input by the user is matched with at least one fingerprint templates of the fingerprint template set, the comparison module 120 determines a matching order according to the weight information of each fingerprint template.

For example, when the target operation is to unlock a mobile terminal using a fingerprint, a fingerprint template set includes five fingerprint templates 1 to 5. In one implementation, the third processing module 170 determines that the matching order of the five fingerprint templates is fingerprint templates 3, 2, 1, 5, and 4 based on the weight information of the fingerprint templates. In order to improve unlocking efficiency of the mobile terminal, when the fingerprint image is matched with the fingerprint templates of the fingerprint template set, the comparison module 120 compares the fingerprint image with the fingerprint template 3 and the match value between the fingerprint image and the fingerprint template 3 is computed. This determines whether the match value is greater than a first preset threshold. If the match value is greater than the first preset threshold, this determines that the fingerprint image input by the user meets requirements to unlock the mobile terminal.

In order to optimize the fingerprint templates in the fingerprint template set, as shown in FIG. 4, the apparatus of recognizing fingerprints further includes a fourth processing module 180. The fourth processing module 180 is configured to rank N fingerprint templates based on their matching frequencies of the fingerprint templates and to remove the fingerprint template having the lowest matching frequency from the fingerprint template set.

In order to maintain a number of the fingerprint templates in the fingerprint template set within a threshold, the fourth processing module 180 is configured to acquire a matching frequency of each fingerprint template and to rank the fingerprint templates in the fingerprint template set based on their matching frequencies. The fingerprint template having the lowest matching frequency for a long time is removed from the fingerprint template set to keep the number of the fingerprint templates in the fingerprint template set as N.

Moreover, as shown in FIG. 4, the apparatus of recognizing fingerprints further includes a fifth processing module 190. The fifth processing module 190 is configured to compare image quality of the fingerprint image with image quality of the ith fingerprint template if a match value between the fingerprint image and the ith fingerprint template of the fingerprint template set is greater than the first preset threshold and is less than the second preset threshold. When the image quality of the fingerprint image is better than the image quality of the ith fingerprint template, the fingerprint image replaces the ith fingerprint template. When the image quality of the fingerprint image is not better than the image quality of the ith fingerprint template, the ith fingerprint template keeps unchanged.

In other words, when the match value between the fingerprint image and the ith fingerprint template of the fingerprint template set is greater than the first preset threshold and is less than the second preset threshold, the fifth processing module 190 is configured to compare the image quality of the fingerprint image with image quality of the ith fingerprint template to determine that the image quality of the fingerprint image is better than the image quality of the ith fingerprint template. The ith fingerprint template is updated based on the fingerprint image to renew the ith fingerprint template so that the fingerprint templates of the fingerprint template set are optimized. The more precise the fingerprint templates of the fingerprint template set, time spent in unlocking the mobile terminal using a fingerprint is decreased, to improve unlocking efficiency of the mobile terminal and user experience.

It should be noted that the above descriptions related to the method of recognizing fingerprints can be applied to the apparatus of recognizing fingerprints, and will not be repeated here.

In the apparatus of recognizing fingerprints of the implementation of the present disclosure, the acquisition module 110 is configured to first acquire a fingerprint image input by a user. The comparison module 120 is configured to compare the fingerprint image with N fingerprint templates in a fingerprint template set. The unlocking module 130 is configured to unlock the mobile terminal according to one of target operations if a match value between the fingerprint image and the ith fingerprint template of the fingerprint template set is greater than the first preset threshold. It is further determined whether a match value between the fingerprint image and the ith fingerprint template of the fingerprint template set is greater than a second preset threshold. If the match value between the fingerprint image and the ith fingerprint template is greater than a second preset threshold, the mobile terminal generates a new fingerprint template based on the fingerprint image and adds the new fingerprint template to the fingerprint template set. Therefore, the fingerprint templates of the fingerprint template set are no longer fixed. In a subsequent match procedure of the fingerprint templates, the fingerprint images input by users continuously improve and supplement the fingerprint templates of the fingerprint template set to increase operational efficiency of the mobile terminal and user experience.

In order to implement the above implementation, the present disclosure further provides a mobile terminal The mobile terminal includes the apparatus of recognizing fingerprints according to an implementation of a second aspect of the present disclosure.

In the mobile terminal of the implementation of the present disclosure, the fingerprint image input by a user is first acquired. The fingerprint image is compared with N fingerprint templates in a fingerprint template set. If a match value between the fingerprint image and the ith fingerprint template of the fingerprint template set is greater than the first preset threshold, the mobile terminal is unlocked. It is further determined whether a match value between the fingerprint image and the ith fingerprint template of the fingerprint template set is greater than a second preset threshold. If the match value between the fingerprint image and the ith fingerprint template is greater than a second preset threshold, the mobile terminal generates a new fingerprint template based on the fingerprint image and adds the new fingerprint template to the fingerprint template set. Therefore, the fingerprint templates of the fingerprint template set are no longer fixed. In a subsequent match procedure of the fingerprint templates, the fingerprint images input by users continuously improve and supplement the fingerprint templates of the fingerprint template set to increase operational efficiency of the mobile terminal and user experience.

In order to implement the above implementation, the present disclosure further provides a mobile terminal. The mobile terminal includes a housing, at least one processor, a memory, a circuit board, and a power circuit. The circuit board is disposed in an internal space surrounded by the housing. The at least one processor and the memory are disposed on the circuit board. The power circuit is configured to supply power to circuits and devices of the mobile terminal. The memory is configured to store executable program instructions. The at least one processor is configured to read the executable program instructions in the memory to implement a procedure corresponding to the executable program instructions. The executable program instructions include the following actions.

A fingerprint image input by a user is acquired.

In detail, an acquisition module acquires the fingerprint image input by the user when the user uses a fingerprint to unlock a mobile terminal.

In one implementation, the mobile terminal is selected from one group consisting of hardware devices with different operating systems, such as a mobile phone, a tablet computer, a personal digital assistant, and electronic books.

The fingerprint image is compared with fingerprint templates pre-stored in a fingerprint template set.

The fingerprint template set includes N fingerprint templates, where N is a positive integer.

In one implementation, when acquiring the fingerprint image input by the user, the fingerprint image is matched with N (e.g., 30) of fingerprint templates in the fingerprint template set and a match value between the fingerprint image and each of the fingerprint templates is computed. This determines whether each of the match values is greater than a first preset threshold.

The first preset threshold is defined as a match threshold between a preset fingerprint image and a fingerprint template. For example, the first preset threshold is represented as 85%.

It should be noted that each of the fingerprint templates includes a fingerprint image pre-stored in the mobile terminal. The fingerprint image input by the user is matched with fingerprint templates in the fingerprint template set. In other words, the fingerprint image input by the user is matched with fingerprint images of the fingerprint templates.

If a match value between the fingerprint image and an ith fingerprint template of the fingerprint template set is greater than the first preset threshold, the mobile terminal performs corresponding target operations, where "i" is a positive number and is less than or equal to N.

In one implementation, the target operations are selected from one group consisting of, but not limited to, an unlocking operation and a mobile payment procedure.

In order to improve operational efficiency of the mobile terminal, each of fingerprint templates in the fingerprint template set includes weight information. In one implementation, when the fingerprint image is matched with fingerprint templates of the fingerprint template set, a matching frequency corresponding to each of the fingerprint templates in the fingerprint template set is acquired. The weight information of each fingerprint template is updated based on the matching frequency corresponding to the fingerprint template.

When updating the weight information corresponding to each of the fingerprint templates, a matching order is determined according to the weight information of each fingerprint template.

In one implementation, higher matching frequencies corresponding to the fingerprint template mean more effective weight information and higher matching order.

In one implementation, the matching frequency relates to a number of match times between a fingerprint template and a fingerprint image input by the user. Higher number of match times between the fingerprint image of the fingerprint template and the fingerprint image input by the user means higher matching frequencies corresponding to the fingerprint template.

When the fingerprint image input by the user is matched with the fingerprint templates of the fingerprint template set, the fingerprint image input by the user is matched with at least one of the fingerprint templates of the fingerprint template set based on the matching order. In other words, the fingerprint image is matched with the fingerprint template having the highest matching order and a match value between the fingerprint image and the fingerprint template is computed. If the match value is greater than a first preset threshold, the mobile terminal performs corresponding target operations to reduce match time spent in matching the fingerprint image with the fingerprint templates in the fingerprint template set, so as to improve operational efficiency of the mobile terminal.

For example, when the target operation is to unlock a mobile terminal using a fingerprint, a fingerprint template set includes five fingerprint templates 1 to 5. The matching order of the five fingerprint templates is fingerprint templates 3, 2, 1, 5, and 4 based on the weight information of the fingerprint templates. In order to improve unlocking efficiency of the mobile terminal, when the fingerprint image is matched with the fingerprint templates of the fingerprint template set, the fingerprint image is compared with the fingerprint template 3 and the match value between the fingerprint image and the fingerprint template 3 is computed. This determines whether the match value is greater than a first preset threshold. If the match value is greater than the first preset threshold, this determines that the fingerprint image input by the user meets requirements to unlock the mobile terminal.

This action determines whether a match value between the fingerprint image and the ith fingerprint template of the fingerprint template set is greater than a second preset threshold.

The second preset threshold is greater than the first preset threshold.

The second preset threshold is defined as a match threshold between a preset fingerprint image and a fingerprint template. For example, the second preset threshold is represented as 95%.

If the match value between the fingerprint image and the ith fingerprint template is greater than a second preset threshold, the mobile terminal generates a new fingerprint template based on the fingerprint image and adds the new fingerprint template to the fingerprint template set.

For example, the first preset threshold is 85% and the second preset threshold is 95%. When a match value between the fingerprint image and the fingerprint template 3 of the fingerprint template set is 96%, the mobile terminal performs corresponding target operations and determines that the match value is greater than the second preset threshold. At this time, the mobile terminal generates a new fingerprint template based on the fingerprint image and adds the new fingerprint template to the fingerprint template set.

If the match value between the fingerprint image and the ith fingerprint template is less than or equal to the second preset threshold, the fingerprint templates of the fingerprint template set keep unchanged.

In the mobile terminal of the implementation of the present disclosure, the fingerprint image input by a user is first acquired. The fingerprint image is compared with N fingerprint templates in a fingerprint template set. If a match value between the fingerprint image and the ith fingerprint template of the fingerprint template set is greater than the first preset threshold, the mobile terminal performs corresponding target operations. It is further determined whether a match value between the fingerprint image and the ith fingerprint template of the fingerprint template set is greater than a second preset threshold. If the match value between the fingerprint image and the ith fingerprint template is greater than a second preset threshold, the mobile terminal generates a new fingerprint template based on the fingerprint image and adds the new fingerprint template to the fingerprint template set. Therefore, the fingerprint templates of the fingerprint template set are no longer fixed. In a subsequent match procedure of the fingerprint templates, the fingerprint images input by users continuously improve and supplement the fingerprint templates of the fingerprint template set to increase operational efficiency of the mobile terminal and user experience.

Figure 5:
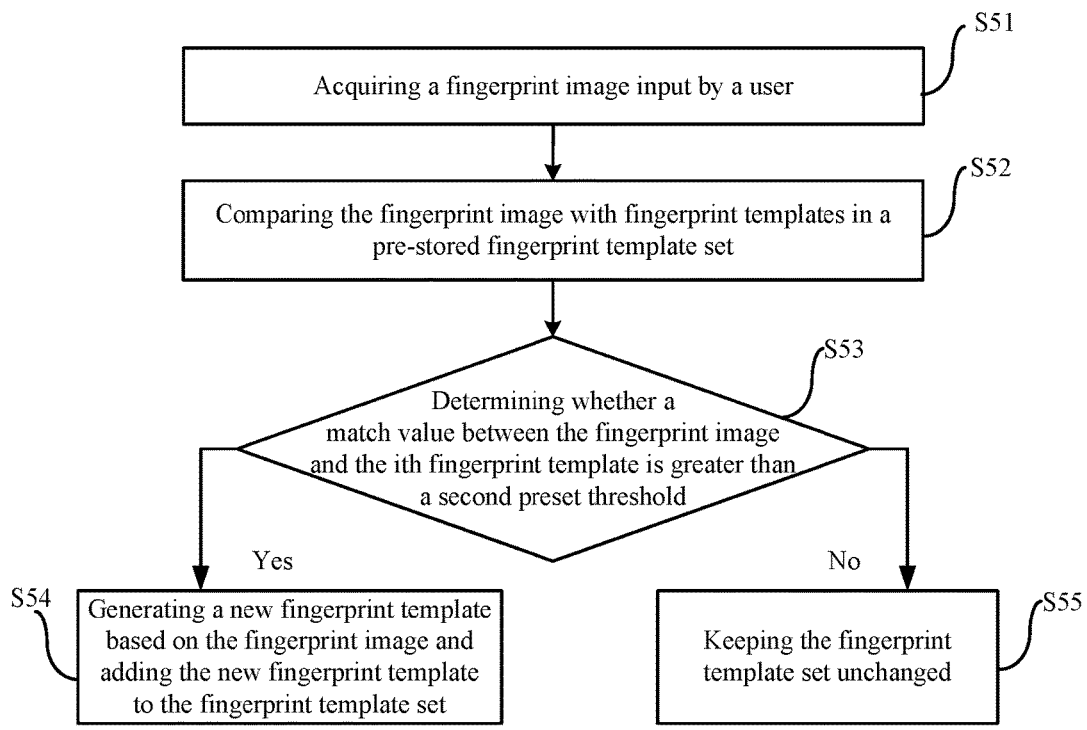
FIG. 5 is an illustrative flowchart of a method of updating fingerprint templates according to one implementation of the present disclosure.

FIG. 5 is an illustrative flowchart of a method of updating fingerprint templates according to one implementation of the present disclosure.

As shown in FIG. 5, the method of updating fingerprint templates includes actions at the following blocks.

At block S51, a fingerprint image input by a user is acquired.

In detail, when a user uses a mobile terminal, an acquisition module of mobile terminal acquires the fingerprint image input by the user.

In one implementation, the mobile terminal is selected from one group consisting of hardware devices with different operating systems, such as a mobile phone, a tablet computer, a personal digital assistant, and electronic books.

At block S52, the fingerprint image is compared with fingerprint templates pre-stored in a fingerprint template set.

The fingerprint template set includes N fingerprint templates, where N is a positive integer.

In one implementation, when acquiring the fingerprint image input by the user, the fingerprint image is matched with N (e.g., 30) of fingerprint templates in the fingerprint template set and a match value between the fingerprint image and each of the fingerprint templates is computed. This determines whether each of the match values is greater than a second preset threshold.

The second preset threshold is defined as a match threshold between a preset fingerprint image and a fingerprint template. For example, the second preset threshold is represented as 95%.

It should be noted that each of the fingerprint templates includes a fingerprint image pre-stored in the mobile terminal. The fingerprint image input by the user is matched with fingerprint templates in the fingerprint template set. In other words, the fingerprint image input by the user is matched with fingerprint images of the fingerprint templates.

In order to improve match efficiency between the fingerprint image and the fingerprint templates in the fingerprint template set, each of the fingerprint templates in the fingerprint template set includes weight information. In one implementation, when the fingerprint image is matched with fingerprint templates of the fingerprint template set, a matching frequency corresponding to each of the fingerprint templates in the fingerprint template set is acquired. The weight information of each fingerprint template is updated based on the matching frequency corresponding to the fingerprint template.

When updating the weight information corresponding to each of the fingerprint templates, a matching order is determined according to the weight information of each fingerprint template.

In one implementation, higher matching frequencies corresponding to the fingerprint template mean more effective weight information and higher matching order.

In one implementation, the matching frequency relates to a number of match times between a fingerprint template and a fingerprint image input by the user. higher matching frequencies corresponding to the fingerprint template mean more effective weight information and higher matching order.

When the fingerprint image input by the user is matched with the fingerprint templates of the fingerprint template set, the fingerprint image input by the user is matched with at least one of the fingerprint templates of the fingerprint template set based on the matching order. In other words, the fingerprint image is matched with the fingerprint template having the highest matching order and a match value between the fingerprint image and the fingerprint template is computed.

At block S53, an action at this block determines whether a match value between the fingerprint image and an ith fingerprint template of the fingerprint template set is greater than a second preset threshold.

At block S54, if the match value is greater than a second preset threshold, the mobile terminal generates a new fingerprint template based on the fingerprint image and adds the new fingerprint template to the fingerprint template set.

For example, the first preset threshold is 85% and the second preset threshold is 95%. When a match value between the fingerprint image and the fingerprint template 3 of the fingerprint template set is 96%, the mobile terminal performs corresponding target operations and determines that the match value is greater than the second preset threshold. At this time, the mobile terminal generates a new fingerprint template based on the fingerprint image and adds the new fingerprint template to the fingerprint template set.

At block S55, if the match value between the fingerprint image and the ith fingerprint template is less than or equal to the second preset threshold, the fingerprint templates of the fingerprint template set keep unchanged.

In the method of updating fingerprint templates of the implementation of the present disclosure, the fingerprint image input by a user is first acquired. The fingerprint image is compared with N fingerprint templates in a fingerprint template set. If the match value between the fingerprint image and the ith fingerprint template is greater than a second preset threshold, the mobile terminal generates a new fingerprint template based on the fingerprint image and adds the new fingerprint template to the fingerprint template set. Therefore, the fingerprint templates of the fingerprint template set are no longer fixed. In a subsequent match procedure of the fingerprint templates, the fingerprint images input by users continuously improve and supplement the fingerprint templates of the fingerprint template set so that the fingerprint templates are optimized and fingerprint recognition rate is improved.

Based on the above-mentioned implementations, the method of updating fingerprint templates further includes that N fingerprint templates are ranked based on their matching frequencies of the fingerprint templates, and one of the fingerprint templates having a lowest matching order is removed from the fingerprint template set.

In detail, a matching frequency of each fingerprint template is acquired and the fingerprint templates in the fingerprint template set are ranked based on their matching frequencies. The fingerprint template having the lowest matching frequency for a long time is removed from the fingerprint template set to keep the number of the fingerprint templates in the fingerprint template set as N.

In other words, when the fingerprint image is matched with the fingerprint template, the fingerprint template having the lowest matching frequency is removed from the fingerprint template set such that the fingerprint templates of the fingerprint template set is optimized. Since fingerprint template quality of the fingerprint template set is gradually improved, a fingerprint recognition rate is increased and FRR is decreased during a subsequent match procedure.

Figure 6:
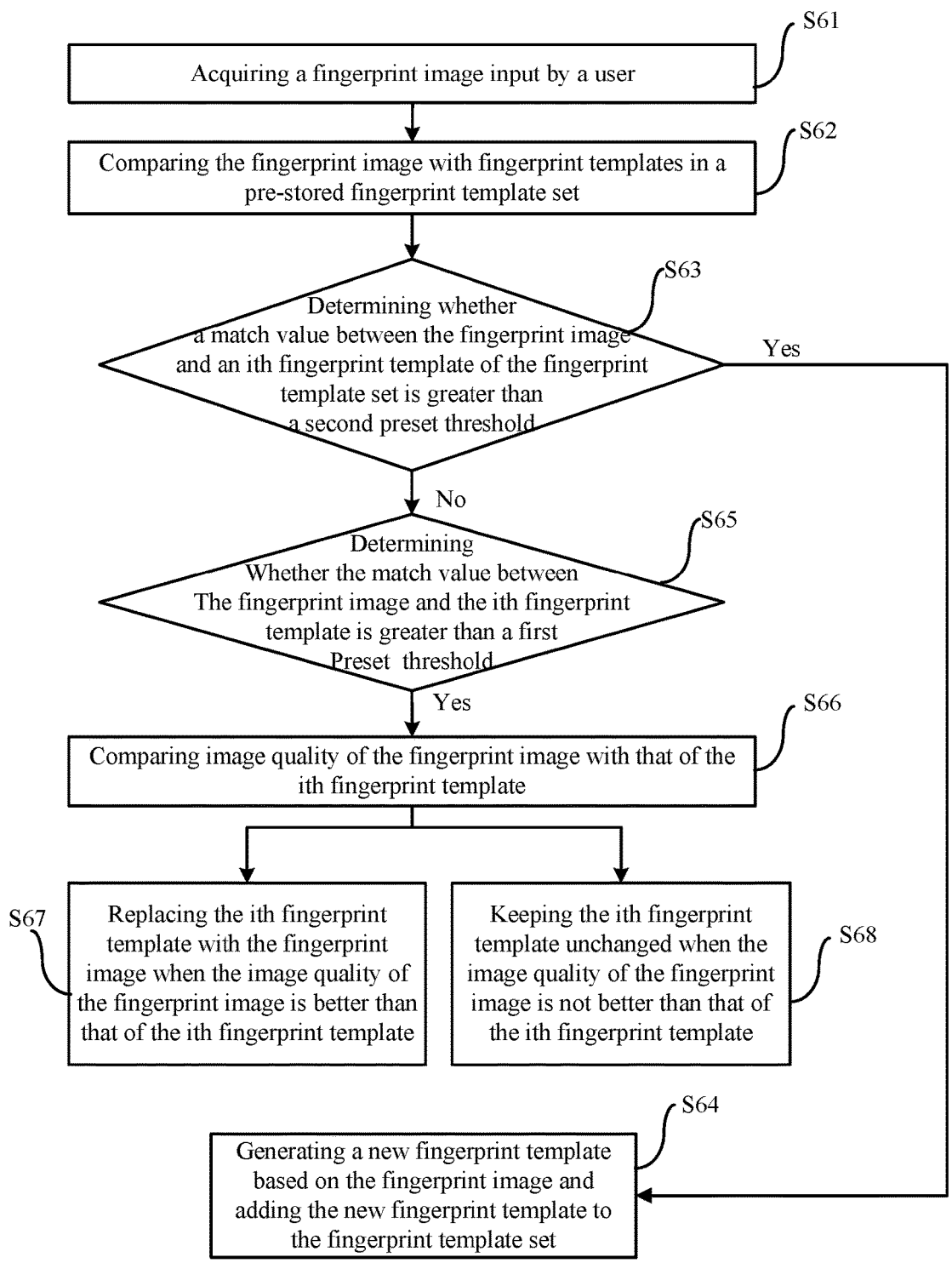
FIG. 6 is an illustrative flowchart of a method of updating fingerprint templates according to another implementation of the present disclosure.

FIG. 6 is an illustrative flowchart of a method of updating fingerprint templates according to another implementation of the present disclosure As shown in FIG. 6, the method of updating fingerprint templates includes the following blocks.

At block S61, a fingerprint image input by a user is acquired.

In detail, when a user uses a mobile terminal, an acquisition module of mobile terminal acquires the fingerprint image input by the user.

In one implementation, the mobile terminal is selected from one group consisting of hardware devices with different operating systems, such as a mobile phone, a tablet computer, a personal digital assistant, and electronic books.

At block S62, the fingerprint image is compared with fingerprint templates pre-stored in a fingerprint template set.

The fingerprint template set includes N fingerprint templates, where N is a positive integer.

In one implementation, when acquiring the fingerprint image input by the user, the fingerprint image is matched with N (e.g., 30) of fingerprint templates in the fingerprint template set and a match value between the fingerprint image and each of the fingerprint templates is computed. This determines whether each of the match values is greater than a second preset threshold.

The second preset threshold is defined as a match threshold between a preset fingerprint image and a fingerprint template. For example, the second preset threshold is represented as 95%.

It should be noted that each of the fingerprint templates includes a fingerprint image pre-stored in the mobile terminal. The fingerprint image input by the user is matched with fingerprint templates in the fingerprint template set. In other words, the fingerprint image input by the user is matched with fingerprint images of the fingerprint templates.

In order to improve match efficiency between the fingerprint image and the fingerprint templates in the fingerprint template set, each of the fingerprint templates in the fingerprint template set includes weight information. In one implementation, when the fingerprint image is matched with fingerprint templates of the fingerprint template set, a matching frequency corresponding to each of the fingerprint templates in the fingerprint template set is acquired. The weight information of each fingerprint template is updated based on the matching frequency corresponding to the fingerprint template.

When updating the weight information corresponding to each of the fingerprint templates, a matching order is determined according to the weight information of each fingerprint template.

In one implementation, higher matching frequencies corresponding to the fingerprint template mean more effective weight information and higher matching order.

In one implementation, the matching frequency relates to a number of match times between a fingerprint template and a fingerprint image input by the user. Higher number of match times between the fingerprint image of the fingerprint template and the fingerprint image input by the user means higher matching frequencies corresponding to the fingerprint template.

The fingerprint image input by the user is matched with at least one of the fingerprint templates of the fingerprint template set based on the matching order. In other words, the fingerprint image is matched with the fingerprint template having the highest matching order and a match value between the fingerprint image and the fingerprint template is computed.

At block S63, an action at this block determines whether a match value between the fingerprint image and an ith fingerprint template of the fingerprint template set is greater than a second preset threshold.

At block S64, if the match value between the fingerprint image and the ith fingerprint template is greater than a second preset threshold, the mobile terminal generates a new fingerprint template based on the fingerprint image and adds the new fingerprint template to the fingerprint template set.

For example, the first preset threshold is 85% and the second preset threshold is 95%. When a match value between the fingerprint image and the fingerprint template 3 of the fingerprint template set is 96%, the mobile terminal performs corresponding target operations and determines that the match value is greater than the second preset threshold. At this time, the mobile terminal generates a new fingerprint template based on the fingerprint image and adds the new fingerprint template to the fingerprint template set.

At block S65, if the match value is less than or equal to the second preset threshold, it is determined whether the match value between the fingerprint image and the ith fingerprint template of the fingerprint template set is greater than a first preset threshold.

The first preset threshold is defined as a match threshold between a preset fingerprint image and a fingerprint template. For example, the first preset threshold is represented as 85%.

At block S66, if the match value is greater than a first preset threshold, image quality of the fingerprint image is compared with the image quality of the ith fingerprint template.

At block S67, if the image quality of the fingerprint image is better than the image quality of the ith fingerprint template, the fingerprint image replaces the ith fingerprint template.

At block S68, if the image quality of the fingerprint image is not better than the image quality of the ith fingerprint template, the ith fingerprint template keeps unchanged.

In one implementation, when the match value between the fingerprint image and the ith fingerprint template of the fingerprint template set is greater than the first preset threshold and is less than the second preset threshold, the image quality of the fingerprint image is compared with image quality of the ith fingerprint template. When the image quality of the fingerprint image is better than the image quality of the ith fingerprint template, the ith fingerprint template is updated based on the fingerprint image to renew the ith fingerprint template. Therefore, the fingerprint templates of the fingerprint template set are optimized. The more precise the fingerprint templates of the fingerprint template set, a fingerprint recognition rate is increased and a false rejection rate (FRR) is decreased during a subsequent match procedure such that the fingerprint recognition becomes better.

In the method of updating fingerprint templates of the implementation of the present disclosure, the fingerprint image input by a user is first acquired. The fingerprint image is compared with N fingerprint templates in a fingerprint template set. It is determined whether a match value between the fingerprint image and the ith fingerprint template of the fingerprint template set is greater than a second preset threshold. If the match value is greater than a second preset threshold, the mobile terminal generates a new fingerprint template based on the fingerprint image and adds the new fingerprint template to the fingerprint template set. Therefore, the fingerprint templates of the fingerprint template set are no longer fixed. In a subsequent match procedure of the fingerprint templates, the fingerprint images input by users continuously improve and supplement the fingerprint templates of the fingerprint template set to increase operational efficiency of the mobile terminal and user experience.

In order to implement the above implementation, the present disclosure further provides an apparatus, where the apparatus can be a part of a mobile terminal or an electronic device. The apparatus also can be an entire mobile terminal or an entire other electronic device with function of fingerprint identification. The apparatus has a function of updating fingerprint templates.

Figure 7:
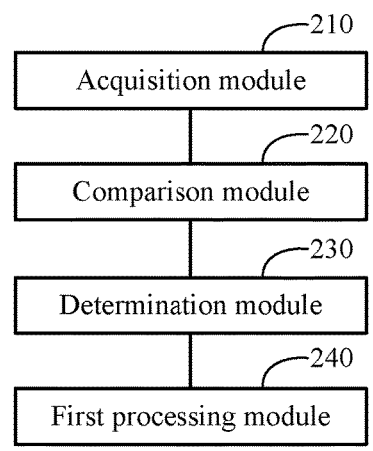
FIG. 7 is an illustrative structural diagram of an apparatus of updating fingerprint templates according to one implementation of the present disclosure.

FIG. 7 is an illustrative structural diagram of an apparatus of updating fingerprint templates according to one implementation of the present disclosure.

A shown in FIG. 7, the apparatus of updating fingerprint templates includes an acquisition module 210, a comparison module 220, a determination module 230, and a first processing module 240.

The acquisition module 210 is configured to acquire a fingerprint image input by a user.

The comparison module 220 is configured to compare the fingerprint image with fingerprint templates pre-stored in a fingerprint template set.

The fingerprint template set includes N fingerprint templates, where N is a positive integer.

The determination module 230 is configured to determine whether a match value between the fingerprint image and the ith fingerprint template of the fingerprint template set is greater than a second preset threshold, where the second preset threshold is greater than the first preset threshold.

The first processing module 240 is configured to generate a new fingerprint template based on the fingerprint image and add the new fingerprint template to the fingerprint template set if the match value between the fingerprint image and the ith fingerprint template is greater than a second preset threshold, the mobile terminal.

Figure 8:
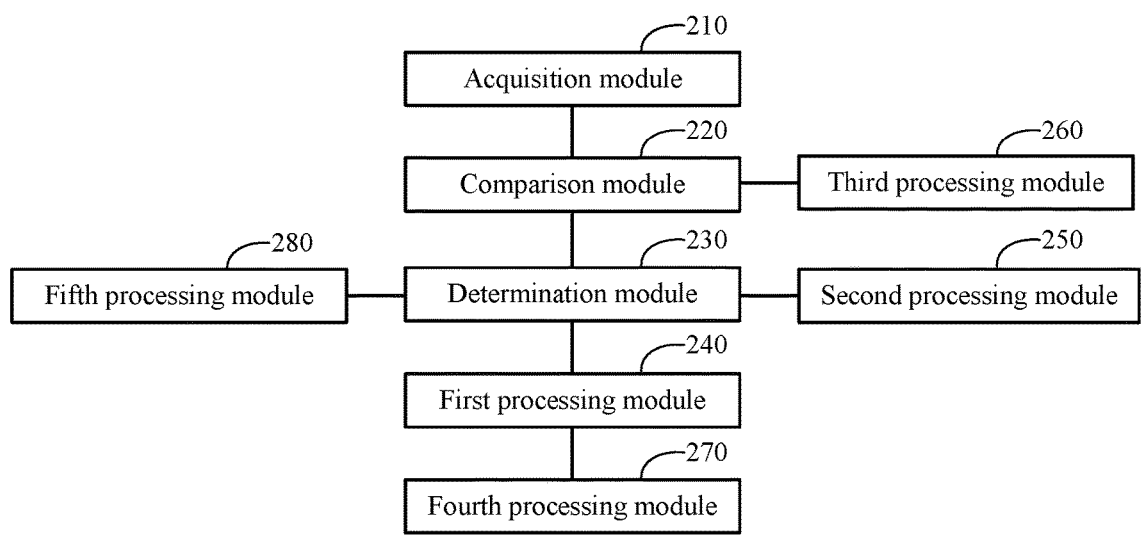
FIG. 8 is an illustrative structural diagram of an apparatus of updating fingerprint templates according to another implementation of the present disclosure.

As shown in FIG. 8, the apparatus of updating fingerprint templates further includes a second processing module 250. The second processing module 250 is configured to keep the fingerprint template set unchanged if the match value between the fingerprint image and the ith fingerprint template is less than or equal to the second preset threshold.

In one implementation, each of fingerprint templates in the fingerprint template set includes weight information. In FIG. 8, the apparatus of updating fingerprint templates further includes a third processing module 260. The third processing module 260 is configured to acquire a matching frequency corresponding to each of the fingerprint templates in the fingerprint template set. Furthermore, the third processing module 260 is configured to update the weight information of each fingerprint template based on the matching frequency corresponding to the fingerprint template.

In one implementation, higher matching frequencies corresponding to the fingerprint template mean more effective weight information and higher matching order.

When the fingerprint image input by the user is matched with at least one fingerprint templates of the fingerprint template set, the comparison module 220 determines a matching order according to the weight information of each fingerprint template.

For example, a fingerprint template set includes five fingerprint templates 1 to 5. In one implementation, the third processing module 260 determines that the matching order of the five fingerprint templates is fingerprint templates 3, 2, 1, 5, and 4 based on the weight information of the fingerprint templates. In order to improve unlocking efficiency of the mobile terminal, when the fingerprint image is matched with the fingerprint templates of the fingerprint template set, the comparison module 220 compares the fingerprint image with the fingerprint template 3 and the match value between the fingerprint image and the fingerprint template 3 is computed. This determines whether the match value is greater than a first preset threshold.

In order to optimize the fingerprint templates in the fingerprint template set, as shown in FIG. 8, the apparatus of recognizing fingerprints further includes a fourth processing module 270. The fourth processing module 270 is configured to rank N fingerprint templates based on the matching frequencies of the fingerprint templates to remove the fingerprint template having the lowest matching frequency from the fingerprint template set.

In order to maintain a number of the fingerprint templates in the fingerprint template set within a threshold, the fourth processing module 270 is configured to acquire a matching frequency of each fingerprint template to rank the fingerprint templates in the fingerprint template set based on the matching frequency. The fourth processing module 270 is configured to remove the fingerprint template that has the lowest matching frequency for a long time. This keeps the number of the fingerprint templates in the fingerprint template set as N.

Moreover, in FIG. 8, the apparatus of updating fingerprint templates further includes a fifth processing module 280. The fifth processing module 280 is configured to further determine whether a match value between the fingerprint image and the ith fingerprint template of the fingerprint template set is greater than the first preset threshold if the match value between the fingerprint image and the ith fingerprint template of the fingerprint template set is less than the second preset threshold. If the match value is greater than the first preset threshold, the fifth processing module 280 compares the image quality of the fingerprint image with the image quality of the ith fingerprint template. When the image quality of the fingerprint image is better than the image quality of the ith fingerprint template, the fingerprint image replaces the ith fingerprint template. When the image quality of the fingerprint image is not better than the image quality of the ith fingerprint template, the ith fingerprint template keeps unchanged.

It should be noted that the above descriptions related to a method of updating fingerprint templates can be applied to an apparatus of updating fingerprint templates, and will not be repeated here.

In the apparatus of updating fingerprint templates of the implementation of the present disclosure, the acquisition module is configured to first acquire a fingerprint image input by a user. The comparison module is configured to compare the fingerprint image with N fingerprint templates in a fingerprint template set. The determination module determines whether a match value between the fingerprint image and the ith fingerprint template of the fingerprint template set is greater than a second preset threshold. If the match value between the fingerprint image and the ith fingerprint template is greater than a second preset threshold, the first processing module generates a new fingerprint template based on the fingerprint image and adds the new fingerprint template to the fingerprint template set. Therefore, the fingerprint templates are no longer fixed. In a subsequent match procedure of the fingerprint templates, the fingerprint images input by users continuously improve and supplement the fingerprint templates of the fingerprint template set such that the fingerprint templates are optimized to increase fingerprint recognition rate.

In order to implement the above implementation, the present disclosure further provides a mobile terminal.

The mobile terminal includes the apparatus of updating fingerprint templates according to a sixth implementation of the present disclosure.

In the mobile terminal of the implementation of the present disclosure. the fingerprint image input by a user is first acquired. The fingerprint image is compared with N fingerprint templates in a fingerprint template set. If the match value between the fingerprint image and the ith fingerprint template is greater than a second preset threshold, the mobile terminal generates a new fingerprint template based on the fingerprint image and adds the new fingerprint template to the fingerprint template set. Therefore, the fingerprint templates of the fingerprint template set are no longer fixed. In a subsequent match procedure of the fingerprint templates, the fingerprint images input by users continuously improve and supplement the fingerprint templates of the fingerprint template set so that the fingerprint templates are optimized and fingerprint recognition rate is improved.

In order to implement the above implementation, the present disclosure further provides a mobile terminal.

Figure 9:
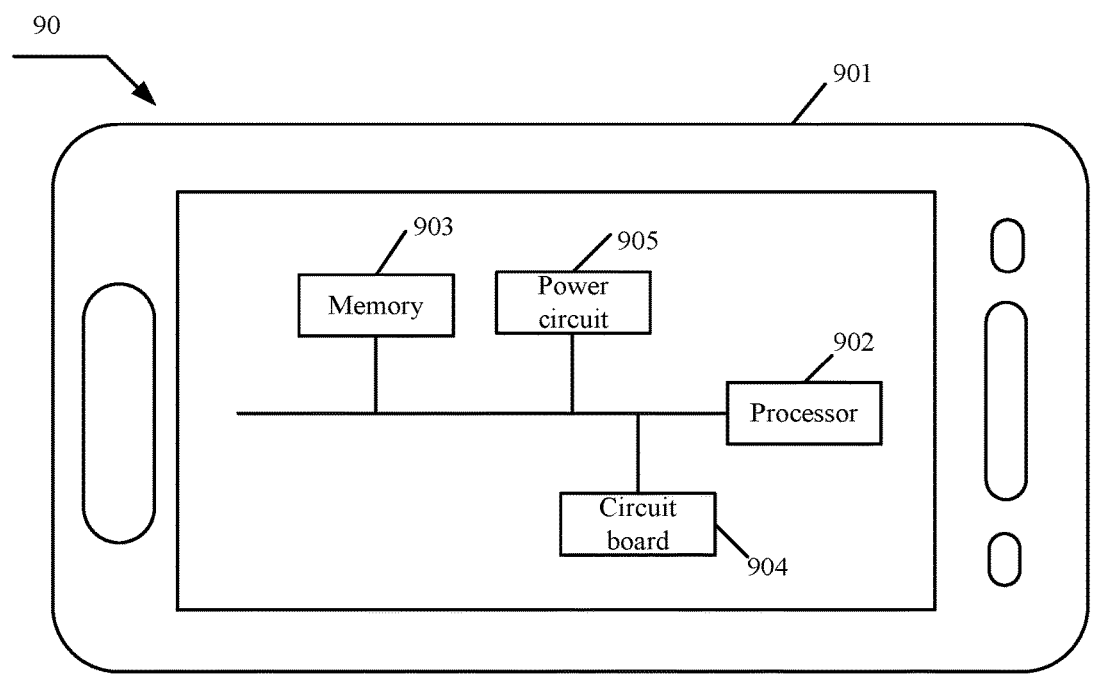
FIG. 9 is an illustrative structural diagram of a mobile terminal according to one implementation of the present disclosure.

FIG. 9 is an illustrative structural diagram of a mobile terminal according to one implementation of the present disclosure. As shown in FIG. 9, the mobile terminal 90 includes a housing 901, at least one processor 902, a memory 903, a circuit board 904, and a power circuit 905. The circuit board 904 is disposed in an internal space surrounded by the housing 901. The at least one processor 902 and the memory 903 are disposed on the circuit board 904. The power circuit 905 is configured to supply power to circuits and devices of the mobile terminal 90. The memory 903 is configured to store executable program instructions. The at least one processor 902 is configured to read the executable program instructions in the memory 903 to implement a procedure corresponding to the executable program instructions. The executable program instructions include the following actions.

A fingerprint image input by a user is acquired.

In detail, an acquisition module acquires the fingerprint image input by the user when the user uses a fingerprint to unlock a mobile terminal.

In one implementation, the mobile terminal is selected from one group consisting of hardware devices with different operating systems, such as a mobile phone, a tablet computer, a personal digital assistant, and electronic books.

The fingerprint image is compared with fingerprint templates pre-stored in a fingerprint template set.

The fingerprint template set includes N fingerprint templates, where N is a positive integer.

In detail, when acquiring the fingerprint image input by the user, the fingerprint image is matched with N (e.g., 30) of fingerprint templates in the fingerprint template set and a match value between the fingerprint image and each of the fingerprint templates is computed. This determines whether each of the match values is greater than a first preset threshold.

The first preset threshold is defined as a match threshold between a preset fingerprint image and a fingerprint template. For example, the first preset threshold is represented as 85%.

It should be noted that each of the fingerprint templates includes a fingerprint image pre-in the mobile terminal. The fingerprint image input by the user is matched with fingerprint templates in the fingerprint template set. In other words, the fingerprint image input by the user is matched with fingerprint images of the fingerprint templates.

In order to improve operational efficiency of the mobile terminal, each of fingerprint templates in the fingerprint template set includes weight information. In one implementation, when the fingerprint image is matched with fingerprint templates of the fingerprint template set, a matching frequency corresponding to each of the fingerprint templates in the fingerprint template set is acquired. The weight information of each fingerprint template is updated based on the matching frequency corresponding to the fingerprint template.

When updating the weight information corresponding to each of the fingerprint templates, a matching order is determined according to the weight information of each fingerprint template.

In one implementation, higher matching frequencies corresponding to the fingerprint template mean more effective weight information and higher matching order.

In one implementation, the matching frequency relates to a number of match times between a fingerprint template and a fingerprint image input by the user. Higher number of match times between the fingerprint image of the fingerprint template and the fingerprint image input by the user means higher matching frequencies corresponding to the fingerprint template.

When the fingerprint image input by the user is matched with the fingerprint templates of the fingerprint template set, the fingerprint image input by the user is matched with at least one of the fingerprint templates of the fingerprint template set based on the matching order. In other words, the fingerprint image is matched with the fingerprint template having the highest matching order and a match value between the fingerprint image and the fingerprint template is computed. If the match value is greater than a first preset threshold, the mobile terminal performs corresponding target operations to reduce match time spent in matching the fingerprint image with the fingerprint templates in the fingerprint template set, so as to improve operational efficiency of the mobile terminal.

For example, when the target operation is to unlock a mobile terminal using a fingerprint, a fingerprint template set includes five fingerprint templates 1 to 5. The matching order of the five fingerprint templates is fingerprint templates 3, 2, 1, 5, and 4 based on the weight information of the fingerprint templates. In order to improve unlocking efficiency of the mobile terminal, when the fingerprint image is matched with the fingerprint templates of the fingerprint template set, the fingerprint image is compared with the fingerprint template 3 and the match value between the fingerprint image and the fingerprint template 3 is computed. This determines whether the match value is greater than a first preset threshold. If the match value is greater than the first preset threshold, this determines that the fingerprint image input by the user meets requirements to unlock the mobile terminal.

This action determines whether a match value between the fingerprint image and an ith fingerprint template of the fingerprint template set is greater than a second preset threshold.

The second preset threshold is greater than the first preset threshold.

The second preset threshold is defined as a match threshold between a preset fingerprint image and a fingerprint template. For example, the second preset threshold is represented as 95%.

If the match value between the fingerprint image and the ith fingerprint template is greater than a second preset threshold, the mobile terminal generates a new fingerprint template based on the fingerprint image and adds the new fingerprint template to the fingerprint template set.

For example, the first preset threshold is 85% and the second preset threshold is 95%. When a match value between the fingerprint image and the fingerprint template 3 of the fingerprint template set is 96%, the mobile terminal performs corresponding target operations and determines that the match value is greater than the second preset threshold. At this time, the mobile terminal generates a new fingerprint template based on the fingerprint image and adds the new fingerprint template to the fingerprint template set.

If the match value between the fingerprint image and the ith fingerprint template is less than or equal to the second preset threshold, the fingerprint templates of the fingerprint template set keep unchanged.

In the mobile terminal of the implementation of the present disclosure, the fingerprint image input by a user is first acquired. The fingerprint image is compared with N fingerprint templates in a fingerprint template set. If a match value between the fingerprint image and the ith fingerprint template of the fingerprint template set is greater than the first preset threshold, the mobile terminal performs corresponding target operations. It is further determined whether a match value between the fingerprint image and the ith fingerprint template of the fingerprint template set is greater than a second preset threshold. If the match value between the fingerprint image and the ith fingerprint template is greater than a second preset threshold, the mobile terminal generates a new fingerprint template based on the fingerprint image and adds the new fingerprint template to the fingerprint template set. Therefore, the fingerprint templates of the fingerprint template set are no longer fixed. In a subsequent match procedure of the fingerprint templates, the fingerprint images input by users continuously improve and supplement the fingerprint templates of the fingerprint template set to increase operational efficiency of the mobile terminal and user experience.

In the present disclosure, reference terms "one implementation", "some implementations", "example", "a specific example", or "some examples" in connection with the implementation or example are described by specific features, the structure, material, or characteristic which is included In one implementation of the disclosure or examples in this specification. The schematic representations of the terms are not necessarily to the same implementation or example. Furthermore, the particular features, structures, the material, or characteristics may be any one or more of the implementations or examples combined in a suitable manner. In addition, in the case of not mutually inconsistent, persons skilled in the art can combine or assemble different implementations or examples.

In addition, the terms "first" and "second" are used for descriptive purposes only, and should not be taken to indicate or imply relative importance or implicitly indicate the number of technical features. Thus, defining features "first" and "second" may explicitly or implicitly include at least one of the features. In the description of the present disclosure, a "plurality" means at least two, for example, two or three, unless clearly specifically defined.

Flowchart diagrams, any processes or methods described by different manners can be understood that modules, fragments or portions of executable instruction codes for implementing specific logical functions or steps. Persons skilled in related art should be noted that the implementations of the present disclosure can be implemented in a substantially simultaneous manner or in a reverse order to perform functions.

Logic units and actions at blocks in the flowchart are defined as a sequence table of executable instructions for implementing logical functions. The sequence table of executable instructions can be embodied in any computer-readable medium for an instruction execution system, an apparatus, or a device (e.g., computer-based system, a system having a processor, or an instruction execution system, an apparatus, or a device to access the instructions and execute the instructions). In the present disclosure, "computer-readable medium" can include of storage, communication, propagation, transmission programs or the combinations. The "computer-readable medium" includes at least one of electrical wired connection portion (e.g., an electronic devices), a portable computer diskette (e.g., a magnetic device), a random access memory (RAM), a read-only memory (ROM), erasable programmable read-only memory (e.g., EPROM or flash memory), fiber optic devices, and a portable compact disc read-only memory (e.g., CDROM). In addition, the computer-readable medium can even be paper or suitable medium on which the programs are printed. For example, the paper or suitable medium are optically scanned. The programs on the paper or suitable medium are electronically obtained using compiled and interpreted manners and stored in computerized memory.

It should be understood that portions of the present disclosure may be implemented in hardware, software, firmware, or combinations thereof. In the above-described implementations, a plurality of actions or methods may be stored in a memory and are executed by software or firmware implemented in a suitable instruction execution system. If actions at the blocks or methods may be implemented, for example, in hardware, as in another implementation, any one of the following techniques or combinations thereof in the related art may be used. The techniques include a discrete logic circuit of logic gate circuits to implement logic functions on data signals, an application specific integrated circuit having appropriate combinational logic gate circuits, a programmable gate array (PGA), and a field programmable gate array (FPGA).

Persons skilled in the related art should be noted that all or part of actions in the above-described implementations can be implemented by program instructions executable in hardware. The program instructions are stored in computer-readable medium and the program instructions are performed for at least one of actions at the blocks.

Furthermore, each of functional units may be integrated in one processing unit or be a separate physical unit. For example, two or more units are integrated in a single unit. The integrated units can be implemented in a form of hardware or software unit. In one implementation, when the integrated units are implemented in the form of a software unit which is sold or used as an independent product, the integrated units can be stored in a computer-readable storage medium.

The computer-readable storage medium can be a read-only memory, a magnetic disk or optical disk. As is understood by a person skilled in the art, the foregoing preferred implementations of the present disclosure are illustrative rather than limiting of the present disclosure. It is intended that they cover various modifications and similar arrangements be included within the spirit and scope of the present disclosure, the scope of which should be accorded the broadest interpretation so as to encompass all such modifications and similar structures.

What is claimed is:

1. A method for updating fingerprint templates, comprising:
   acquiring a fingerprint image input by a user;
   comparing the fingerprint image with fingerprint templates pre-stored in a fingerprint template set, wherein the fingerprint template set comprises N fingerprint templates and N is a positive integer;
   determining whether a match value between the fingerprint image and an ith fingerprint template of the fingerprint template set is greater than a second preset threshold, wherein i is a positive number and is less than or equal to N;
   generating a new fingerprint template based on the fingerprint image and adding the new fingerprint template to the fingerprint template set, if the match value is greater than the second preset threshold;
   wherein comparing the fingerprint image with the fingerprint templates comprises:
      determining a matching order of each of the fingerprint templates; and
      comparing, based on the matching order, the fingerprint image with the fingerprint templates;
   wherein each of the fingerprint templates in the fingerprint template set comprises corresponding weight information, wherein determining the matching order of each of the fingerprint templates comprises:
      acquiring a matching frequency corresponding to each of the fingerprint templates in the fingerprint template set, wherein the matching frequency relates to a number of match times between a fingerprint template and the fingerprint image input by the user; and
      determining the weight information of each of the fingerprint templates based on the matching frequency corresponding to each of the fingerprint templates; and
      determining the matching order of each of the fingerprint templates according to the weight information of each of the fingerprint templates.

2. The method of claim 1, further comprising:
   keeping the fingerprint template set unchanged if the match value is less than or equal to the second preset threshold.

3. The method of claim 1, further comprising:
   updating the weight information of each of the fingerprint templates based on the match frequency corresponding to each of the fingerprint templates when the fingerprint image input by the user is matched with the fingerprint templates in the fingerprint template set; and
   updating the matching order of each of the fingerprint templates according to updated weight information of each of the fingerprint templates.

4. The method of claim 1, further comprising:
   ranking the N fingerprint templates based on matching frequencies of the fingerprint templates, to obtain the matching order of each of the fingerprint templates; and
   removing one of the fingerprint templates having a lowest ranked from the fingerprint template set when the new fingerprint template is added to the fingerprint template set.

5. The method of claim 1, further comprising:
   determining whether the match value is greater than a first preset threshold, if the match value is less than the second preset threshold;
   comparing image quality of the fingerprint image with that of the ith fingerprint template if the match value is greater than the first preset threshold;
   replacing the ith fingerprint template with the fingerprint image if the image quality of the fingerprint image is better than that of the ith fingerprint template; and
   keeping the ith fingerprint template unchanged if the image quality of the fingerprint image is not better than that of the ith fingerprint template.

6. A non-transitory computer-readable storage medium storing a computer program, which, when executed by a processor, causes the processor to:
   acquire a fingerprint image input by a user;
   compare the fingerprint image with fingerprint templates pre-stored in a fingerprint template set, wherein the fingerprint template set comprises N fingerprint templates and N is a positive integer;
   determine whether a match value between the fingerprint image and an ith fingerprint template of the fingerprint template set is greater than a second preset threshold, wherein i is a positive number and is less than or equal to N;
   generate a new fingerprint template based on the fingerprint image and add the new fingerprint template to the fingerprint template set, when the match value is greater than the second preset threshold,
   wherein the computer program that causes the processor to compare the fingerprint image with the fingerprint templates causes the processor to:
      determine a matching order of each of the fingerprint templates; and
      compare, based on the matching order, the fingerprint image with the fingerprint templates;
   wherein each fingerprint template in the fingerprint template set comprises corresponding weight information, wherein the computer program that causes the processor to determine the matching order of each of the fingerprint templates causes the processor to:
  acquire a matching frequency corresponding to each of the fingerprint templates in the fingerprint template set, wherein the matching frequency relates to a number of match times between a fingerprint template and the fingerprint image input by the user; and
  determine the weight information of each of the fingerprint templates based on the matching frequency corresponding to each of the fingerprint templates; and
  determine the matching order of each of the fingerprint templates according to the weight information of each of the fingerprint templates.

7. The non-transitory computer-readable storage medium of claim 6, wherein the computer program further causes the processor to:
  keep the fingerprint template set unchanged when the match value is less than or equal to the second preset threshold.

8. The non-transitory computer-readable storage medium of claim 6, wherein the computer program further causes the processor to:
  update the weight information of each of the fingerprint templates based on the match frequency corresponding to each of the fingerprint templates when the fingerprint image input by the user is matched with at least one of the fingerprint templates in the fingerprint template set; and
  updating the matching order of each of the fingerprint templates according to updated weight information of each of the fingerprint templates.

9. The non-transitory computer-readable storage medium of claim 6, wherein the computer program further causes the processor to:
  rank the N fingerprint templates based on matching frequencies of the fingerprint templates, to obtain the matching order of each of the fingerprint templates; and
  remove one of the fingerprint templates having a lowest ranked from the fingerprint template set when the new fingerprint template is added to the fingerprint template set.

10. The non-transitory computer-readable storage medium of claim 6, wherein the computer program further causes the processor to:
  determine whether the match value is greater than a first preset threshold, if the match value is less than the second preset threshold;
  compare image quality of the fingerprint image with that of the ith fingerprint template if the match value is greater than the first preset threshold;
  replace the ith fingerprint template with the fingerprint image if the image quality of the fingerprint image is better than that of the ith fingerprint template; and
  keep the ith fingerprint template unchanged if the image quality of the fingerprint image is not better than that of the ith fingerprint template.

11. A mobile terminal comprising:
  a processor;
  a memory coupled to the processor and storing computer executable program codes thereon, which when executed by the processor, cause the processor to:
  acquire a fingerprint image input by a user;
  compare the fingerprint image with fingerprint templates pre-stored in a fingerprint template set, wherein the fingerprint template set comprises N fingerprint templates and N is a positive integer;
  determine whether a match value between the fingerprint image and an ith fingerprint template of the fingerprint template set is greater than a second preset threshold wherein i is a positive number and is less than or equal to N;
  generate a new fingerprint template based on the fingerprint image and add the new fingerprint template to the fingerprint template set, if the match value is greater than the second preset threshold;
  wherein the program codes that cause the processor to compare the fingerprint image with the fingerprint templates causes the processor to:
  determine a matching order of each of the fingerprint templates; and
  compare, based on the matching order, the fingerprint image with the fingerprint templates;
  wherein each of the fingerprint templates in the fingerprint template set comprises corresponding weight information, wherein the program codes that cause the processor to determine the matching order of each of the fingerprint templates causes the processor to:
  acquire a matching frequency corresponding to each of the fingerprint templates in the fingerprint template set, wherein the matching frequency relates to a number of match times between a fingerprint template and the fingerprint image input by the user; and
  determine the weight information of each of the fingerprint templates based on the matching frequency corresponding to each of the fingerprint templates; and
  determine the matching order of each of the fingerprint templates according to the weight information of each of the fingerprint templates.

12. The mobile terminal of claim 11, wherein the program codes further cause the processor to:
  keep the fingerprint template set unchanged when the match value is less than or equal to the second preset threshold.

13. The mobile terminal of claim 11, wherein the program codes further cause the processor to:
  update the weight information of each of the fingerprint templates based on the match frequency corresponding to each of the fingerprint templates when the fingerprint image input by the user is matched with at least one of the fingerprint templates in the fingerprint template set; and
  updating the matching order of each of the fingerprint templates according to updated weight information of each of the fingerprint templates.

14. The mobile terminal of claim 11, wherein the program codes further cause the processor to:
  rank the N fingerprint templates based on matching frequencies of the fingerprint templates, to obtain the matching order of each of the fingerprint templates; and
  remove one of the fingerprint templates having a lowest ranked from the fingerprint template set when the new fingerprint template is added to the fingerprint template set.

15. The mobile terminal of claim 11, wherein the program codes further causes the processor to:
  determine whether the match value is greater than a first preset threshold, if the match value is less than the second preset threshold;

compare image quality of the fingerprint image with that of the ith fingerprint template if the match value is greater than the first preset threshold;

replace the ith fingerprint template with the fingerprint image if the image quality of the fingerprint image is better than that of the ith fingerprint template; and keep the ith fingerprint template unchanged if the image quality of the fingerprint image is not better than that of the ith fingerprint template.

\* \* \* \* \*